(No Model.)

J. E. BEAUCHEMIN.
HORSE HAY RAKE.

No. 284,166. Patented Sept. 4, 1883.

2 Sheets—Sheet 1.

Witnesses:
A. Harvey.
Louis Gauthier.

J. E. Beauchemin
Inventor,
By J. Boursolle
Atty (No Model.)
J. E. BEAUCHEMIN.
HORSE HAY RAKE.
No. 284,166. Patented Sept. 4, 1883.
2 Sheets—Sheet 2.
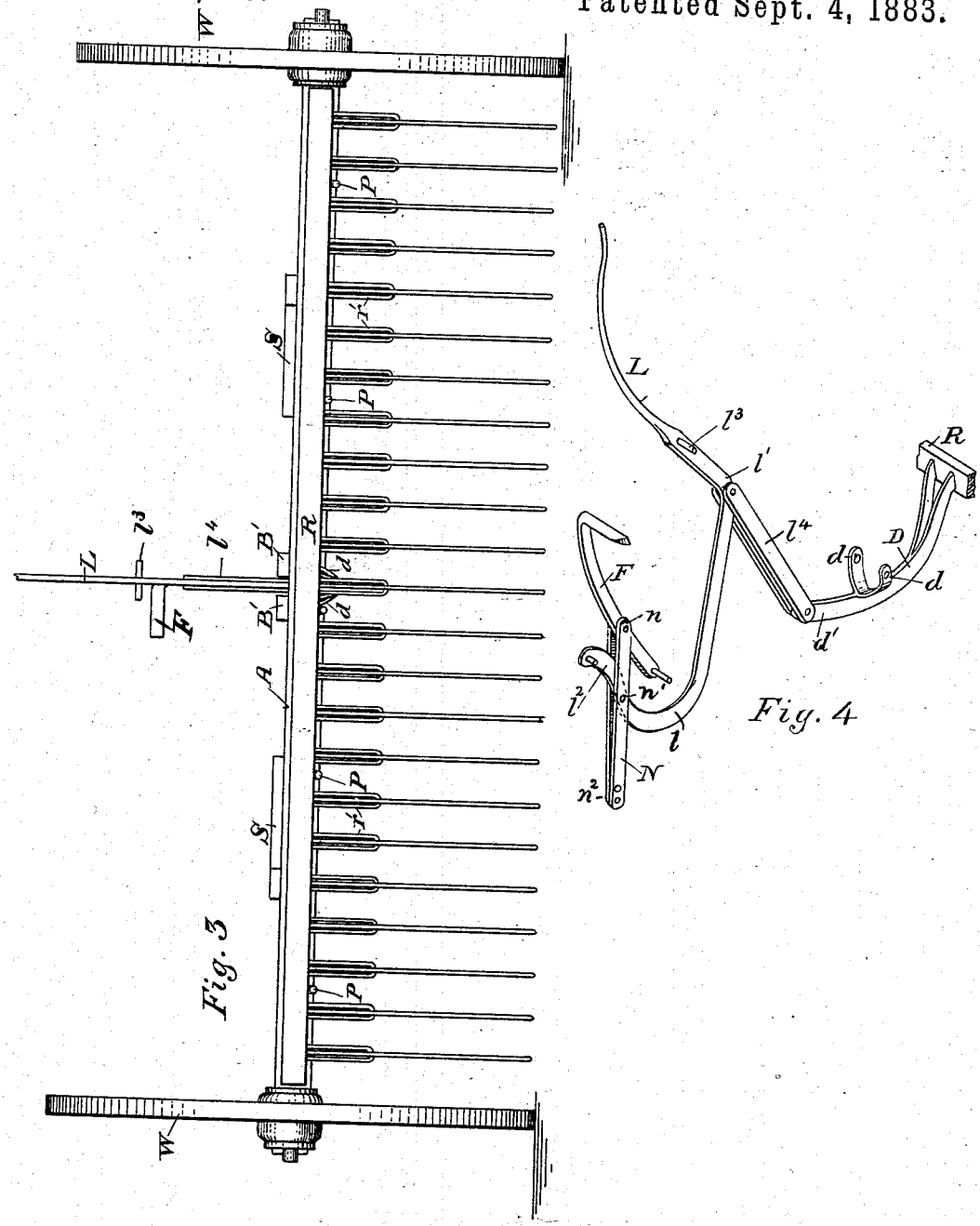
Witnesses:
A. Harvey.
Louis Gauthier.
J. E. Beauchemin
Inventor,
By J. Hoursolle
Atty

UNITED STATES PATENT OFFICE.

JOSEPH E. BEAUCHEMIN, OF SOREL, QUEBEC, CANADA.

HORSE HAY-RAKE.

SPECIFICATION forming part of Letters Patent No. 284,166, dated September 4, 1883.

Application filed February 15, 1883. (No model.)

*To all whom it may concern:*

Be it known that I, JOSEPH E. BEAUCHEMIN, of Sorel, in the Province of Quebec, Canada, have invented certain new and useful Improvements in Horse-Rakes; and I do hereby declare the following to be a full, clear, and exact description of the same.

The object of my improvements is to simplify the draft and dumping mechanism of horse-rakes without impairing their efficiency, and thereby provide a strong, simple, durable, and cheap implement.

Figure 1:
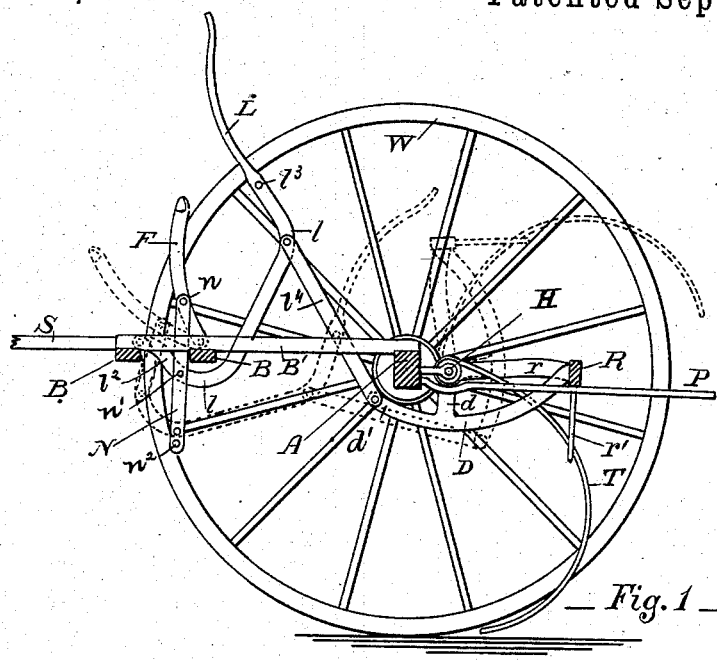
Figure 2:
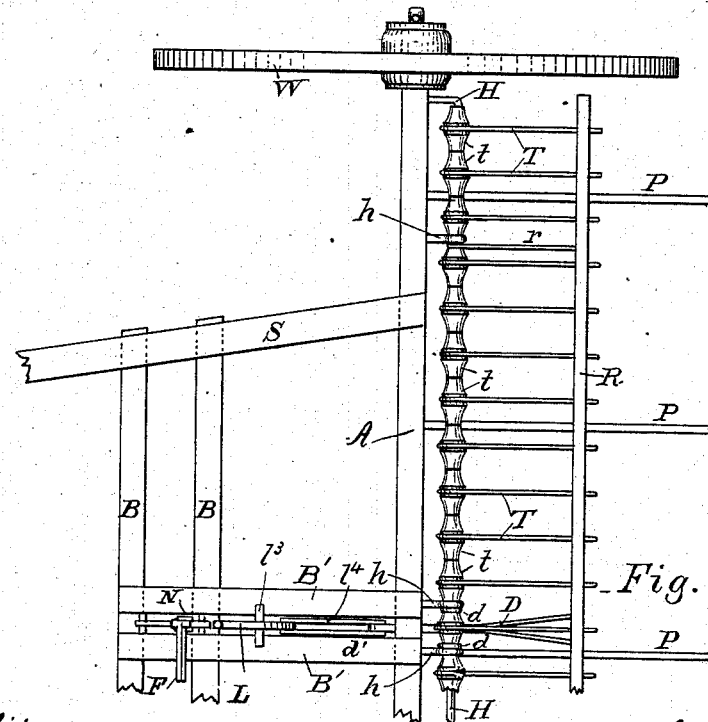

Figure 1 is a longitudinal section of my improved rake, showing the rake-teeth in their lowest position, the dotted lines indicating the position of the mechanism when the rake-teeth are raised. Fig. 2 is a partial top view of the same. Fig. 3 is a rear view. Fig. 4 is a perspective view of the dumping mechanism.

A is the axle of the implement, supported by wheels W W. To this axle the thills S S are attached, and braced by two cross-bars, B B, supporting, together with the axle, the two longitudinal bars B' B', the thills S and bars B and B constituting the whole of the framework, and the bars B' supporting the dumping device. At the rear of and parallel to the axle, and supported from the latter by suitable brackets, $h$, a rod, H, is secured, upon which the heads of the rake-teeth T are pivoted, each tooth being attached to a separate hub, $t$, which turns freely upon the rod H. The length of these hubs T, which bear end to end, determines the distance between the rake-teeth.

R is the lifting-bar, swinging from the rake-head H by means of arms $r$ pivoted upon it. The lifting-bar R is furnished with a series of depending bars, $r'$, provided with elongated eyes or slots through which the rake-teeth T pass, and by means of which the teeth may all be raised simultaneously or allowed to drop and rest on the ground. When in its lowest position the lifting-bar R rests on the fixed arms P, projecting from the axle under the rake-head. These arms act as strippers when the teeth are lifted up. The lifting-bar R is further connected to the rake-head H by a swinging dumping-bracket lever, D, firmly secured to the bar R and journaled upon the rod H by means of a double arm, $d\ d$, a rake-tooth passing through the split shank. The opposite end, $d'$, of the dumping-lever is perforated for connection with the dumping mechanism.

The dumping mechanism consists of a hand dumping-lever, L, having a flexure at $l$ and another at $l'$, resembling what is technically known as a "wheelbarrow-lever," but having an upturned end, $l^2$, which is pivoted to the bars B', its lowest position being determined by the dead-centers or a pin, $l^3$, in the upper limb of the lever, which pin comes to rest upon the upper side of the bars B' or other support. This lever is connected at the flexure $l'$ by links $l^4\ l^4$ to the end $d'$ of dumping-bracket D. A foot bracket-lever, F, is pivoted to the bars B' in the rear of the pivotal support of the lever L, and pivotally connected by a pair of links or double bar, N, to the lever L at the points $n$ and $n'$ respectively, the whiffletree being attached to the prolonged lower end, $n^2$, the links thus acting also as a draft bar or lever. When the hand-lever L and the foot-lever F stand in their highest positions, represented in Fig. 1, the rake-teeth are in a depressed or operative position. It will be observed that the form and arrangement of the levers F and L, with respect to each other, and with respect to the points at which the draft-lever N is pivoted to them, are such that when the parts are in an operative position the forward strain or draft upon the lower end of the lever N will not have the effect of operating the other levers, but will, on the contrary, tend to hold them in their normal positions, as shown, thus tending to keep the teeth down. A slight movement, however, of the foot-lever F forward, or of the hand-lever backward, will so change the relative position of the pivotal points or centers that the forward draft or strain upon the lower end of the lever N will then assist in continuing the movement of the levers and effecting the elevation of the teeth. As the elevation of the teeth to their highest point is completed the centers of the levers assume the relative positions indicated in dotted lines in Fig. 1, in which position the draft is sufficient to retain the teeth in an elevated position. A small expenditure of power, however, applied to throw the levers toward their original positions will be sufficient to effect the depression of the teeth.

While it is preferred to extend both the hand-lever and the foot-lever above the operative parts to which they are pivoted, to the end that both foot and hand power may be rendered available to effect the dumping action of the rake, it is manifest that the foot-lever may be terminated at the point N, or the hand-lever terminated at the point $l'$, either lever being alone sufficient to institute the initial movement necessary to cause the application of the draft for the purpose of raising the rake-head.

I claim as my invention—

1. In a horse hay-rake, the vertically-swinging lifter-bar, the dumping bracket or lever pivoted to the rake-head and connected to said bar, the hand-lever L, curved substantially as described, and connected by a link, $l^4$, with the bracket, the foot-lever F, and the draft-lever N, pivoted to the hand and foot levers, as described.

2. In a horse hay-rake, the combination of the wheeled frame and vertically-swinging lifter-bar, of a hand-lever connected with and serving to elevate said bar, a foot-lever pivoted upon the main frame, and a draft-lever pivoted to the hand and foot levers, substantially in the manner described and shown.

3. In combination with the wheeled frame and the vertically-swinging lifter-bar, the draft-lever N, the foot-lever L, and hand-lever F, arranged to swing in opposite directions and pivoted to the draft-lever, and the connection between the hand-lever and lifter-bar, substantially as shown.

4. In a rake, the combination with the vertically-swinging lifter-bar, of the bracket D, the hand-lever L, curved at the points $l$ and $l'$, and pivoted at its extreme lower end, the link $l^4$, the upright foot-lever F, pivoted at its lower end, and the draft-lever N, pivoted at a central point to the hand-lever in rear of the fulcrum of said lever and pivoted at its upper end to the foot-lever, as described.

Signed at Sorel this 12th day of January, 1883.

JOSEPH E. BEAUCHEMIN.

In presence of—
  W. H. CHAPDELAINE,
  C. H. BECAULIEN.